(12) United States Patent
Geissler

(10) Patent No.: US 8,780,024 B2
(45) Date of Patent: Jul. 15, 2014

(54) PROJECTOR AND METHOD FOR PROJECTING AN IMAGE

(75) Inventor: Enrico Geissler, Jena (DE)

(73) Assignee: Carl Zeiss AG, Oberkochen (DE)

( * ) Notice: Subject to any disclaimer, the term of this patent is extended or adjusted under 35 U.S.C. 154(b) by 133 days.

(21) Appl. No.: 13/001,382

(22) PCT Filed: Jun. 23, 2009

(86) PCT No.: PCT/EP2009/004532
§ 371 (c)(1),
(2), (4) Date: Mar. 31, 2011

(87) PCT Pub. No.: WO2009/156131
PCT Pub. Date: Dec. 30, 2009

(65) Prior Publication Data
US 2011/0175926 A1    Jul. 21, 2011

Related U.S. Application Data

(60) Provisional application No. 61/075,140, filed on Jun. 24, 2008.

(30) Foreign Application Priority Data

Jun. 24, 2008 (DE) .......................... 10 2008 029 786

(51) Int. Cl.
*G09G 3/34* (2006.01)
*H04N 5/74* (2006.01)

(52) U.S. Cl.
USPC ........................................... 345/84; 348/758

(58) Field of Classification Search
USPC ..................................................... 353/57–65
See application file for complete search history.

(56) References Cited

U.S. PATENT DOCUMENTS 4,330,282 A    5/1982  Nash
5,075,789 A    12/1991 Jones et al.
(Continued)

FOREIGN PATENT DOCUMENTS

DE    197 23 208 A1    12/1998
EP    1 269 756 B1      5/2004
(Continued)

OTHER PUBLICATIONS

Hornbeck, Larry J., "Digital Light Processing™ for High-Brightness, High-Resolution Applications," Texas Instruments, Digital Video Operations, Feb. 1997 (pp. 1-14).

(Continued)

*Primary Examiner* — Quan-Zhen Wang
*Assistant Examiner* — Chad Dicke
(74) *Attorney, Agent, or Firm* — Patterson Thuente Pedersen, P.A.

(57) ABSTRACT

A projector having an illumination modulator to modulate the intensity of the light in a pixel-individual manner, a projection lens projecting the light being modulated in a pixel-individual manner onto an image modulator to generate the image to be projected such that each illumination pixel is associated with at least one image pixel. A controller which generates illumination control data and generates image control data for the image modulator. The illumination control data are generated such that they have an on-value for each illumination pixel that is associated with at least one image pixel intended to represent a brightness value in the image that exceeds a predetermined threshold value according to the image data, said on-value selected such that each illumination pixel being associated with at least one image pixel intended to represent a brightness value according to the image data that exceeds a predetermined threshold value and falls short of a predetermined maximum value, is also at least temporarily switched to the second state during periods when the at least one associated image pixel is switched to the second state.

10 Claims, 12 Drawing Sheets

(56) References Cited

U.S. PATENT DOCUMENTS

| | | | |
|---|---|---|---|
| 5,079,544 A | 1/1992 | DeMond et al. | |
| 5,175,637 A | 12/1992 | Jones et al. | |
| 5,192,946 A | 3/1993 | Thompson et al. | |
| 5,214,420 A | 5/1993 | Thompson et al. | |
| 5,231,388 A | 7/1993 | Stoltz | |
| 5,280,277 A | 1/1994 | Hornbeck | |
| 5,287,096 A | 2/1994 | Thompson et al. | |
| 5,392,869 A | 2/1995 | Fröschl et al. | |
| 5,481,321 A | 1/1996 | Lipton | |
| 5,559,629 A | 9/1996 | Sheets et al. | |
| 5,815,641 A * | 9/1998 | Marshall | 358/1.8 |
| 5,978,142 A | 11/1999 | Blackham et al. | |
| 6,457,833 B1 * | 10/2002 | Ishikawa et al. | 353/99 |
| 6,817,717 B2 | 11/2004 | Childers et al. | |
| 6,817,719 B2 | 11/2004 | Rudolph et al. | |
| 6,850,352 B1 | 2/2005 | Childers | |
| 6,891,672 B2 | 5/2005 | Whitehead et al. | |
| 6,985,272 B2 | 1/2006 | Bridgwater et al. | |
| 7,002,533 B2 | 2/2006 | Sayag | |
| 7,018,046 B2 | 3/2006 | Childers et al. | |
| 7,050,122 B2 | 5/2006 | Gibbon et al. | |
| 7,064,740 B2 | 6/2006 | Daly | |
| 7,092,137 B2 | 8/2006 | Childers et al. | |
| 7,106,505 B2 | 9/2006 | Whitehead et al. | |
| 7,136,205 B1 | 11/2006 | Kaye | |
| 7,136,209 B2 | 11/2006 | Lerner et al. | |
| 7,136,210 B2 | 11/2006 | Harper | |
| 7,172,297 B2 | 2/2007 | Whitehead et al. | |
| 7,175,279 B2 | 2/2007 | Drazic et al. | |
| 7,175,289 B2 | 2/2007 | Lerner et al. | |
| 7,213,922 B2 | 5/2007 | Suzuki et al. | |
| 7,224,335 B2 * | 5/2007 | Gibbon et al. | 345/84 |
| 7,224,411 B2 | 5/2007 | Gibbon et al. | |
| 7,370,979 B2 | 5/2008 | Whitehead et al. | |
| 7,431,460 B2 | 10/2008 | Hall, Jr. et al. | |
| 7,517,095 B2 | 4/2009 | Coates et al. | |
| 7,663,795 B2 | 2/2010 | Blackham | |
| 7,777,945 B2 | 8/2010 | Whitehead et al. | |
| 2004/0001184 A1 | 1/2004 | Gibbons et al. | |
| 2004/0169823 A1 | 9/2004 | Bridgwater et al. | |
| 2005/0168699 A1 | 8/2005 | Suzuki et al. | |
| 2005/0190140 A1 | 9/2005 | Asahi et al. | |
| 2006/0055897 A1 | 3/2006 | Lerner et al. | |
| 2006/0087712 A1 * | 4/2006 | Harper | 359/237 |
| 2006/0114416 A1 | 6/2006 | O'Donnell et al. | |
| 2006/0158619 A1 | 7/2006 | Hall, Jr. et al. | |
| 2006/0203202 A1 | 9/2006 | Uchiyama et al. | |
| 2006/0244921 A1 | 11/2006 | Childers | |
| 2007/0076172 A1 | 4/2007 | Lerner et al. | |
| 2007/0103768 A1 | 5/2007 | Blackham | |
| 2007/0126996 A1 | 6/2007 | Coates et al. | |
| 2007/0216872 A1 | 9/2007 | Hall, Jr. | |
| 2007/0229718 A1 | 10/2007 | Hall, Jr. | |
| 2009/0225236 A1 | 9/2009 | Yoon | |
| 2011/0175926 A1 | 7/2011 | Geissler | |
| 2011/0175953 A1 | 7/2011 | Geissler | |
| 2011/0176120 A1 | 7/2011 | Geissler et al. | |

FOREIGN PATENT DOCUMENTS

| | | |
|---|---|---|
| FR | 289980 A1 | 10/2007 |
| WO | WO 98/56186 | 12/1998 |
| WO | WO 01/69941 A2 | 9/2001 |

OTHER PUBLICATIONS

Bleha, W.P., "Image Light Amplifier (ILA) Technology for Large-Screen Projection," *SMPTE Journal*, Oct. 1997 (pp. 710-717).

* cited by examiner

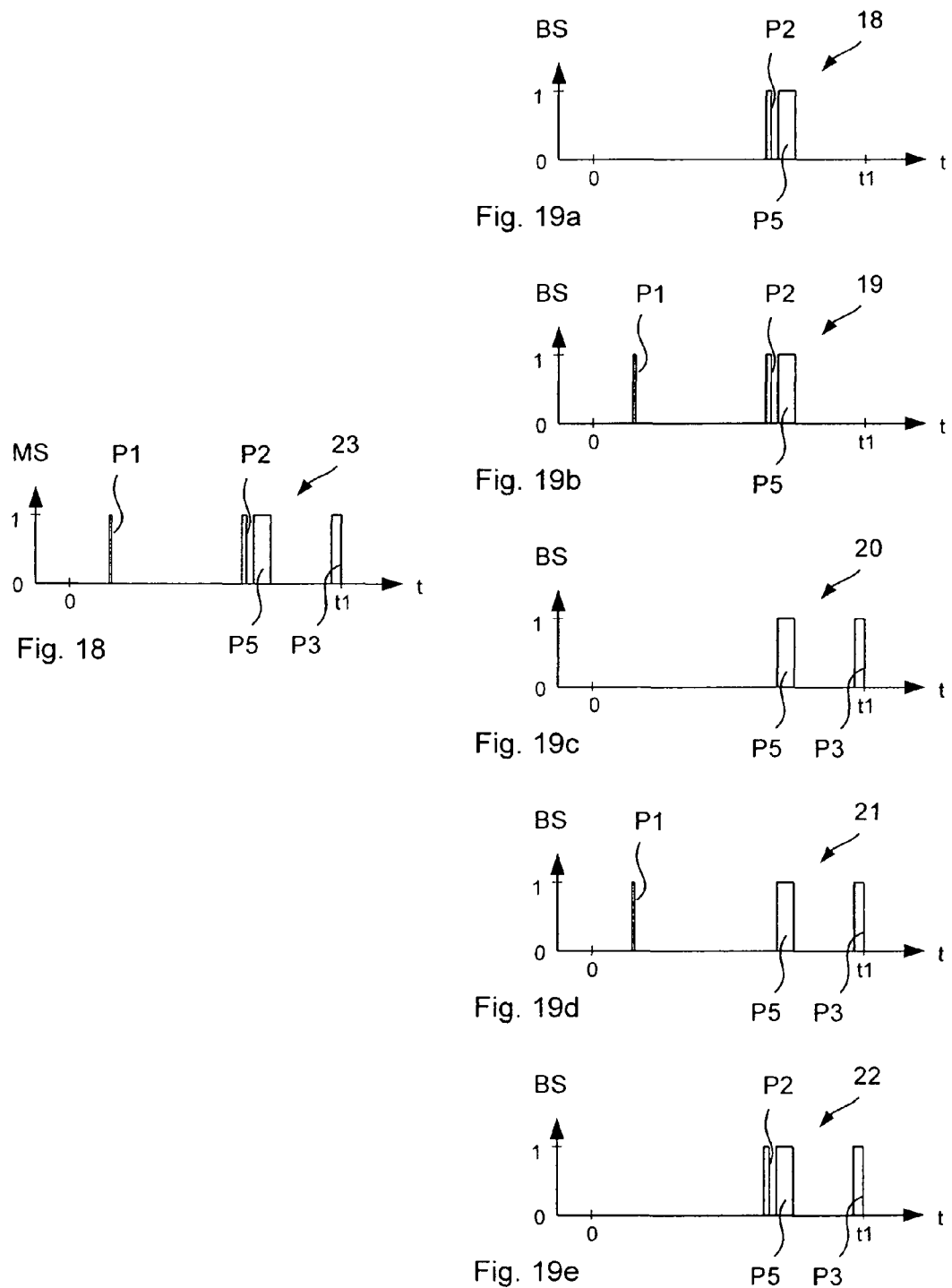

PROJECTOR AND METHOD FOR PROJECTING AN IMAGE

PRIORITY CLAIM

The present application is a National Phase entry of PCT Application No. PCT/EP2009/004532, filed Jun. 23, 2009, which claims priority from German Patent Application Number 102008029786.0, filed Jun. 24, 2008, and U.S. Provisional Application No. 61/075,140, filed Jun. 24, 2008, the disclosures of which are hereby incorporated by reference herein in their entirety.

FIELD OF THE INVENTION

The present invention relates to a projector and a method for projecting an image.

In particular the invention relates to a projector for projecting an image with a first and second spatial modulator each with n×m modulator pixels which are imaged onto one another by means of imaging optics, wherein the first modulator is struck by light and the image is generated by means of the second modulator. Such a projector is known for example from U.S. Pat. No. 7,050,122 B2.

SUMMARY OF THE INVENTION

The black level in the generated image can be reduced by such an arrangement. However, the problem arises that an absolutely precise imaging is almost impossible to achieve in practice. For example, with a desired, pixel-accurate imaging, this leads to the modulator pixels of the second modulator which are to represent black and which are adjacent to modulator pixels which are to represent a certain brightness in the image being illuminated. As a result, an undesired increase in the black level occurs in the case of such modulator pixels of the second modulator.

According to the invention a projector for projecting an image is to be provided with which this problem can be solved. Furthermore, a corresponding method for projecting an image is to be provided.

The problem is solved by a projector for projecting an image as described and claimed herein.

As each illumination pixel which is allocated to at least one image pixel which is, according to the image data, to represent a brightness value which lies above the predetermined threshold value and below a predetermined maximum value is at least sometimes also switched into the second state during the times when the at least one allocated image pixel is switched into the second state, the background brightness can be minimized during the times when these illumination pixels are switched into the second state.

The predetermined threshold value is preferably chosen such that the lowest still representable brightness in the image already lies above the threshold value. Thus it is advantageously achieved that the illumination pixels can have the off-value only for image pixels which are to represent a black image spot.

The predetermined maximum value can be the maximum representable brightness or a lower brightness. In particular the predetermined maximum value can be half the maximum representable brightness.

The projector according to the invention can in particular be designed as a projector for applications in a planetarium such that the image to be projected is projected onto a curved projection surface. The curved projection surface can be part of a planetarium dome. In this design projection takes place usually in the dark, with the result that the achieved reduction in black level brings with it a clear improvement in the image.

The projector can furthermore be designed as a projector for front projection or as a projector for rear projection. The projection surface can be a constituent of the projector.

The imaging optics can be designed as 1:1 imaging optics, as enlarging or reducing imaging optics. The design as enlarging or reducing imaging optics is chosen e.g. if the two modulators are of different sizes. It is essential in particular that the desired allocation of the illumination and image pixels is realized.

The modulators can be designed as LCD, as LCoS modulators or as tilting mirror matrices. The modulators can furthermore be reflective or transmissive. A combination of different types of modulators is also possible. However, it is advantageous to use modulators of the same type, in particular tilting mirror matrices.

Furthermore, a method according to claim 7 is provided. Advantageous versions of the method according to the invention are given in the dependent method claims.

It is understood that the features named above and still to be explained below can be used not only in the given combinations, but also in other combinations or alone, without departing from the framework of the present invention.

BRIEF DESCRIPTION OF THE DRAWINGS

The invention is explained in further detail below by way of example using the attached drawings which also disclose features essential to the invention. There are shown in:

FIG. 18 is a representation explaining the pattern control data MS for the value 23;

FIGS. 19a-19e are representations explaining the image control data BS for the values 18-22;

DETAILED DESCRIPTION

Figure 1:
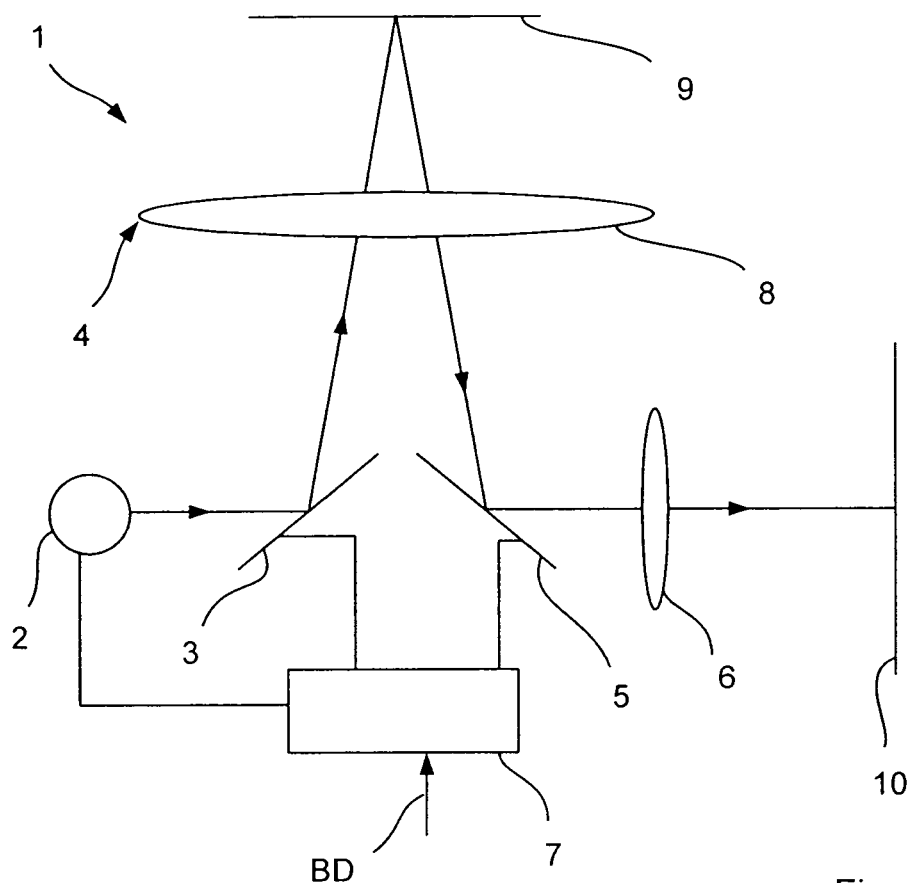
FIG. 1 is a schematic view of the projector according to the invention.

In the embodiment shown in FIG. 1 the projector 1 according to the invention for projecting an image comprises a light source 2, an illumination modulator 3, imaging optics 4, an image modulator 5, a projection lens system 6 as well as a control unit 7.

The two modulators 3, 5 are each designed as a tilting mirror matrix having multiple tilting mirrors in columns and rows, wherein the tilting mirrors can, independently of one another, be brought into a first and into a second tilting position.

Figure 2:
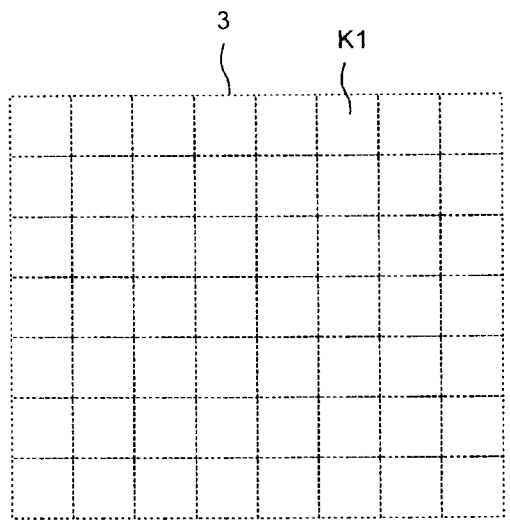
FIG. 2 is a schematic view of the first modulator 3.
Figure 3:
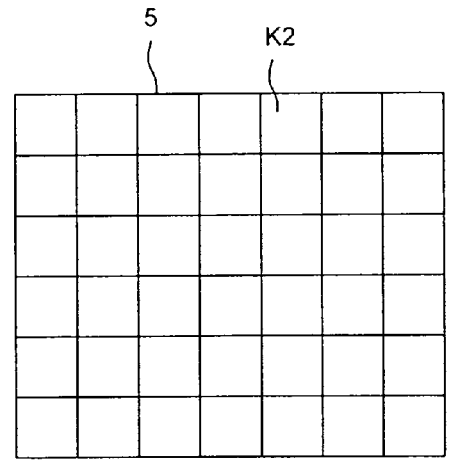
FIG. 3 is a schematic view of the second modulator 5.

In the embodiment example described here the first modulator 3 has 8×7 tilting mirrors K1 (also called illumination pixels below) and the second modulator 5 has 7×6 tilting mirrors K2 (also called image pixels below), as is schematically represented in FIGS. 2 and 3. Here, the tilting mirrors K1 and K2 have the same dimensions. This small number of tilting mirrors K1 and K2 is assumed to simplify the description. Naturally, the modulators 3, 5 can contain very many more tilting mirrors K1, K2. In particular they can in each case contain the same number of tilting mirrors.

The imaging optics 4 are designed as 1:1 imaging optics with a lens 8 and a mirror 9 and image each tilting mirror of the illumination modulator 3, offset by precisely half the dimension of a tilting mirror K2 of the second modulator 5 in column and row direction, onto the second modulator 5, with the result that precisely four tilting mirrors K1 of the first modulator 3 are allocated to each tilting mirror K2 of the second modulator 5. If the two modulators 3, 5 have the same number of tilting mirrors K1, K2, this allocation can e.g. be achieved by not using all the tilting mirrors K2 of the second modulator 5.

Figure 4:
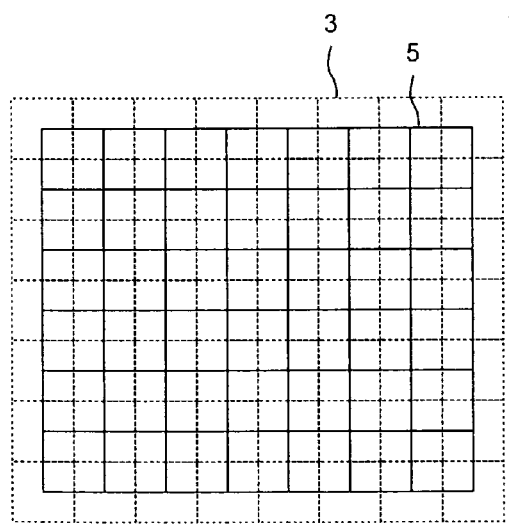
FIG. 4 is a schematic view of the pixel allocation of the two modulators 3, 5.

As the representation of FIG. 4 shows, each tilting mirror K1 of the first modulator 3 that is allocated to a tilting mirror K2 of the second modulator 5 covers precisely one quarter of the pixel surface of the tilting mirror K2.

The two modulators 3 and 5 are controlled by the control unit 7 based on fed-in image data BD such that the illumination modulator 3 which is struck by the light (e.g. white light) from the light source 2 is a 2-dimensionally modulated light source for the image modulator 5 with which the image to be projected is generated or modulated and then projected onto a projection surface 10 by means of the projection lens system 6.

In order to produce the 2-dimensionally modulated light source, the projector 1 is designed such that only the light which is reflected by the tilting mirrors of the illumination modulator 3 which are in the first tilting position is imaged onto the allocated tilting mirrors of the image modulator 5. The light coming from the tilting mirrors of the illumination modulator 3 which are in the second tilting position is collected by a beam trap (not shown) and is thus not imaged onto the image modulator 5. The image is then generated or modulated by the tilting position of the image pixels (=tilting mirrors of the image modulator 5), as only the light coming from the image pixels in the first tilting position is projected via the projection lens system 6 onto the projection surface 10. The light reflected from the image pixels in the second tilting position is not projected onto the projection surface 10, but e.g. collected in a beam trap (not shown). The image to be projected which is projected by the projection lens system 6 is thus modulated or generated by the tilting positions of the image pixels.

In order to reduce the black level (thus the undesired residual brightness which a black image spot still displays) in the projected image, the control unit 7 generates, from the fed-in image data BD, illumination control data MS for the illumination modulator 3 and image control data BS for the image modulator 5 in the manner described below in conjunction with FIGS. 5-9. It is assumed in this description that with both modulators 3, 5 in each case, a pulse-width modulation is carried out in respect of the first and second tilting positions of the tilting mirrors to modulate the intensity of the light falling on them.

Figure 5:
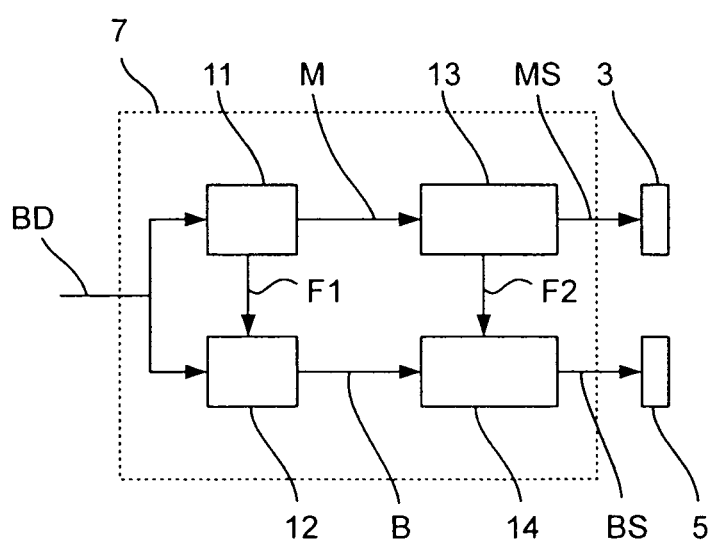
FIG. 5 is a schematic view of the control unit 7 of the projector 1 from FIG. 1.

The image data BD are already in digital form with the suitable pixel resolution for the image modulator 5 with 7×6 tilting mirrors K2 (each image thus has 7×6 image spots) and, as is shown schematically in FIG. 5, are simultaneously input in the control unit 7 into a pattern generator 11 as well as into a delay element 12. With the help of the fed-in image data BD the pattern generator 11 generates pattern data M which are input into a first electronic control unit 13. Based on the pattern data M, the first electronic control unit 13 generates the pulse-width modulated illumination control data MS and inputs these into the illumination modulator 3.

The delay element 12 delays the fed-in image data BD such that they are input as image data B into a second electronic control unit 14 for the image modulator 4 simultaneously with the input of the pattern data M into the first electronic control unit 13. The second electronic control unit 14 generates the pulse-width modulated image control data BS and inputs these into the image modulator 5.

According to the illumination and image control data MS, BS, during the single-image time T, to generate the image the illumination and image pixels K1, K2 are brought into the first and second tilting positions such that the desired image is generated and projected. The single-image time T is the time during which a single image is represented. With films this is e.g. 1/24 seconds if 24 images are represented per second. This applies to the case, described here, of the representation of monochrome images. With multicoloured images, a red, a green and a blue subframe is often generated successively for each image. The single-image time is then e.g. 1/3·1/24 seconds. In order to generate these subframes the light source 2 successively generates e.g. red, green and blue light with which the illumination modulator 3 is illuminated. It is initially assumed for the following description that monochrome images are generated and projected.

The first and second electronic control units 13 and 14 can e.g. be the electronic control unit supplied by the manufacturer of the modulators 3 and 5. In the embodiment example described here these are modulators 3, 5 and electronic control units 13, 14 from Texas Instruments.

Both the input of the data M, B into the two electronic control units 13, 14 as well as the electronic control units 13 and 14 themselves are preferably synchronized, as is indicated by the arrows F1 and F2.

An example of the generation of the control data MS, BS from the fed-in image data BD is given below, wherein it is assumed that each image spot can be represented with a bit depth of 8 (and thus with a brightness value of 0-255), wherein 0 is to be the lowest brightness (thus black) and 255 the greatest brightness.

With a bit depth of 8, the eight allocated bit-switching times P1-P8 (represented as dotted lines in FIG. 6) result for the control data MS, BS together with the bit value 255 (represented as a continuous line in FIG. 6) which corresponds to the whole single-image time T (time from t=0 to t1). A BS or MS value of 1 stands for a tilting mirror K1, K2 which is in the first tilting position and a BS or MS value of 0 for a tilting mirror K1, K2 which is in the second tilting position.

As is customary with pulse-width modulation, the bit-switching time P2 is twice the length of the bit-switching time P1, P3 is twice the length of P2 and so on, wherein the sum of all bit-switching times P1 to P8 corresponds to the single-image time T. The shortest bit-switching time P1 is $$\frac{T}{2^q - 1},$$

wherein T is the single-image time and q the bit depth (here 8).

Figure 6:
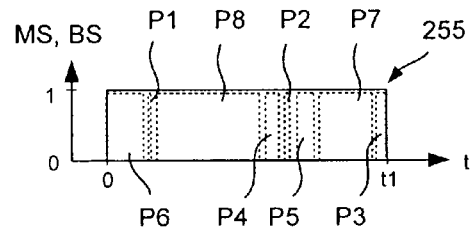
FIG. 6 is a representation explaining bit-switching times of the pulse-width modulated control data MS, BS for a bit depth of 8.

The individual bit-switching times P1-P8 can, as is shown in FIG. 6, each be a continuous time interval within the single-image time T. It is, however, also possible for one or other of the bit-switching times (e.g. P8) to be divided into smaller time slices which are distributed over the single-image time T. Essential here is only that the bit-switching times always have the same temporal distribution relative to the single-image time T.

Figure 7:
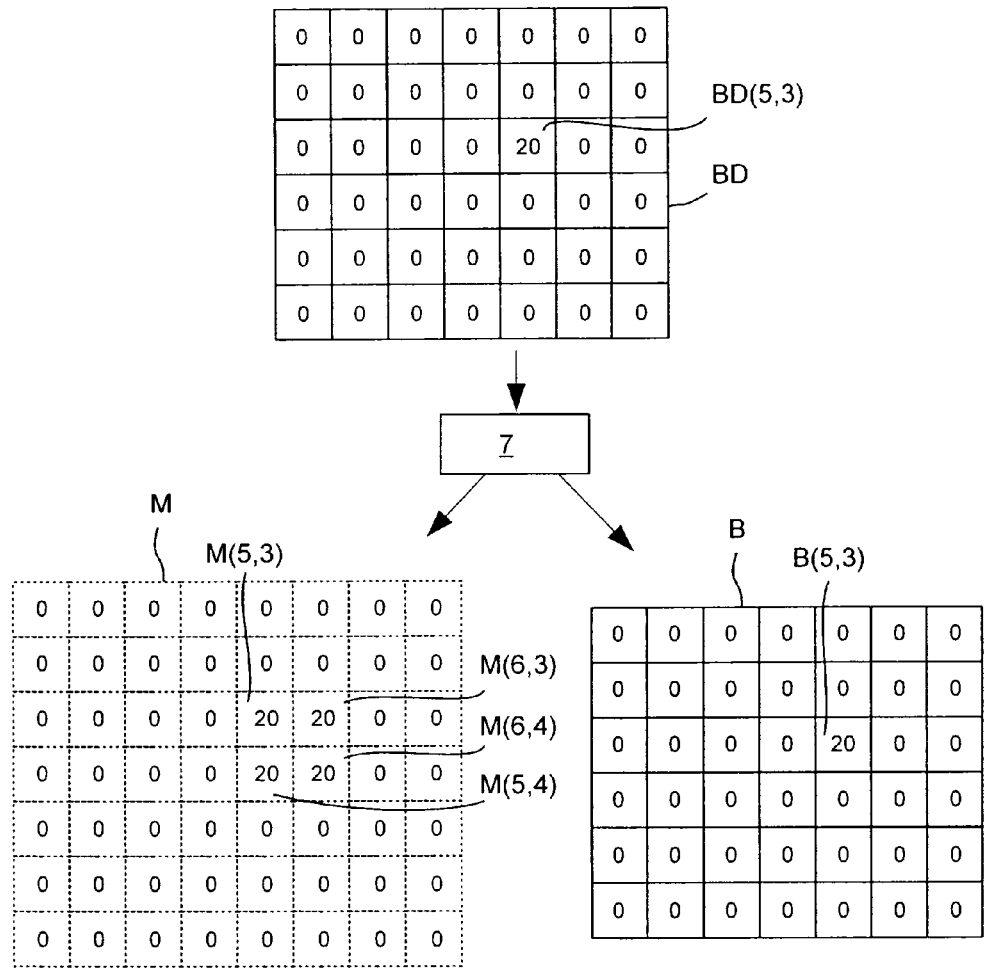
FIG. 7 is a schematic representation explaining the generation of the pattern and image data M, B.

In the case of the fed-in image data BD in FIG. 7, all image spots BD(n,m) (n=column number, m=row number) apart from one are black image spots (value 0). The image spot BD(5,3) in the fifth column (m=5) and third row (n=3) is not black, but is to be represented with a brightness of 20. The control unit 7 generates the pattern data M from the fed-in image data BD as follows for the first electronic control unit 13 and the image data B for the second electronic control unit 14.

The pattern data M have 8×7 pattern spots M(n,m), each of which is allocated to an illumination pixel K1. The image data have 7×6 image spots B(n,m), each of which is allocated to an image pixel K2. The values of the pattern spots M(n,m) and the values of the image spots B(n,m) are each given with a bit depth of 8. If the value is =0 it is also called off-value and if the value is >0 it is also called on-value.

The image data B for the second electronic control unit 14 are not changed by the control unit 7 compared with the originally fed-in image data BD, but only issued time-delayed synchronously with the pattern data M. As is shown in FIG. 7, only the value of the image spot B(5,3) of the image data B is 20, while the values of the remaining image spots are 0.

In the pattern data M all pattern spots M(n,m) are initially set to 0. The pattern spots M(n,m) for the illumination pixels which are allocated to an image pixel which is to represent an intensity value not equal to 0 are then set to this intensity value. Thus in this step the pattern spots M(5,3), M(5,4), M(6,3), M(6,4) are set to 20. The pattern data according to FIG. 7 are generated with these steps.

This choice of the intensity value of 20 for the pattern spots M(5,3), M(5,4), M(6,3) and M(6,4) is possible, as the bit-switching times P1-P8 always have the same temporal distribution relative to the single-image time T and thus the tilting mirror of the image modulator 5 which is to modulate the image spot B(5,3) is illuminated whenever the tilting mirror for the image spot B(5,3) is in its first position.

Figure 8:
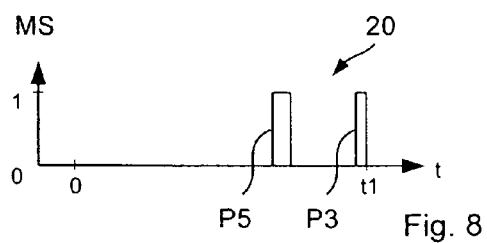
FIG. 8 is a representation explaining the pattern control data MS for the value 20.

The pulse-width control data MS of the first electronic control unit 13 for the single-image time T (time from t=0 to t=t1) for the value 20 of the pattern spot M(5,3) are schematically represented in FIG. 8. The pulse-width modulation data BS of the second electronic control unit 14 for the image spot B(5,3) with the intensity 20 are schematically represented in FIG. 9.

Figure 9:
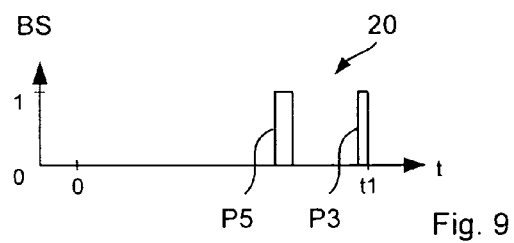
FIG. 9 is a representation explaining the image control data BS for the value 20.

As FIGS. 8 and 9 show, the tilting mirror of the image modulator 5 for the image spot B(5,3) is illuminated only during the bit-switching times P3 and P5 at which the tilting mirror for the image spot B(5,3) is brought into its first position. As the four pattern spots M(5,3), M(5,4), M(6,3), M(6,4) are set to 20 for this, unavoidable imaging errors of the lens system 4 are compensated. This effect is described in conjunction with the schematic representations in FIGS. 9 and 10.

Figure 10:
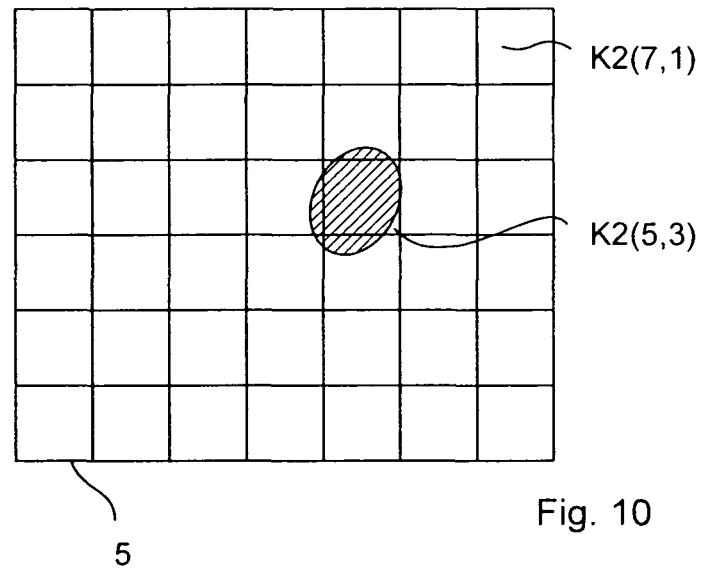
FIGS. 10-13 are schematic representations of the incidence of light on the image modulator 5.

FIG. 10 shows the arrangement of n×m (=7×6) tilting mirrors K2(n,m) of the image modulator 5 as well as the illumination (hatched ellipse) of the tilting mirror K(5,3) present if only, as previously customary, the imaging optics 4 bring about a 1:1-allocation of illumination and image pixels and thus a tilting mirror K1 of the first modulator 3 is imaged precisely onto a tilting mirror K2 of the second modulator 5 (thus without a shift in the column and row direction). As can be seen in FIG. 10, the tilting mirror K(5,3) is not completely illuminated.

Figure 11:
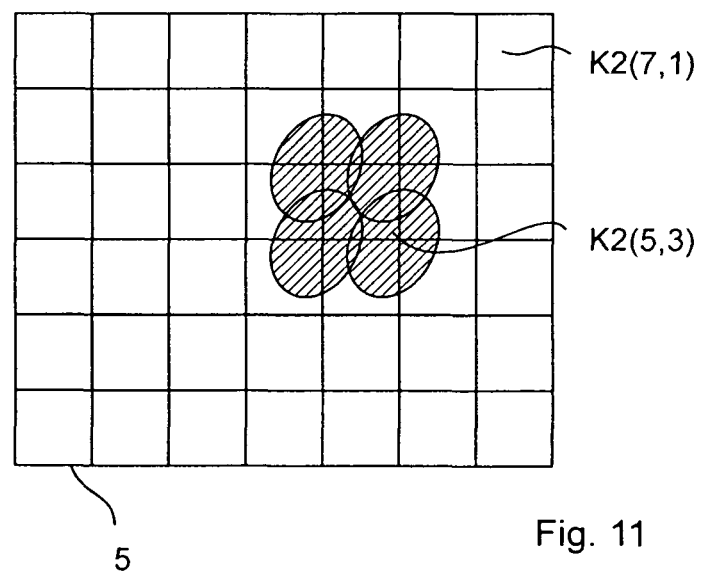

However, with the illumination according to the invention, the pixel shift in the column and row direction, as was described in conjunction with FIG. 4, is present and the four illumination pixels K1 allocated to the image pixel K2(5,3) are switched on, with the result that, as is represented in FIG. 11, the tilting mirror K2(5,3) is illuminated over all four allocated tilting mirrors K1 of the first modulator 3. As a result, the tilting mirror K2(5,3) which is the sole tilting mirror K2 of the image modulator 5 which is in the first position, is extremely uniformly illuminated in two dimensions. Thus the desired intensity value can be represented with a high degree of accuracy. As, furthermore, areas of the image modulator 5 in which several adjacent image pixels are to represent the brightness 0 are not illuminated because of the spatially modulated illumination via the illumination modulator 3, the black level in these areas can also be reduced effectively. With the described example this applies to the areas in which the tilting mirrors K2(n,m) are n=1 to 3 and 7 as well as m=1 to 6 and n=4 to 6 and m=1, 5 and 6. Also, the tilting mirrors K2(4,2), K2(4,3), K2 (4,4), K(5,2), K(5,4), K(6,2), K(6,3) and K(6,4) immediately adjacent to the tilting mirror K2(5,3) are illuminated on the surface and only partially (FIG. 11).

Figure 12:
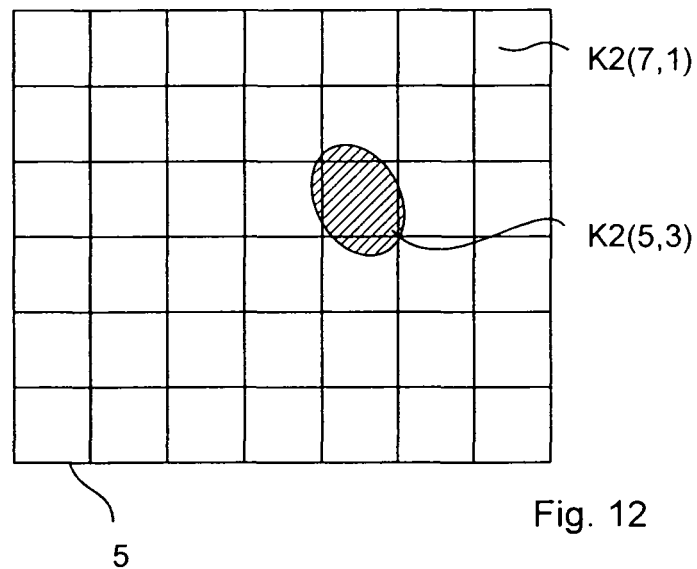

When projecting multicoloured images the problem can arise that the actual illumination depends on the wavelength (thus of the colour subframe). The illumination (hatched ellipse(s)) of the tilting mirror K2(5,3) for a different wavelength is represented schematically in FIG. 12 (illumination through only one illumination pixel in the same manner as in FIG. 10) and FIG. 13 (illumination through four illumination pixels according to FIG. 11) compared with FIGS. 10 and 11. As a comparison with FIGS. 10 and 12 shows, different-sized portions of the tilting-mirror surface of the tilting mirror K2(5,3) are illuminated, depending on the wavelength. This leads to colour artefacts when representing an image, as the subframes are then not present in the projected image as desired.

Figure 13:
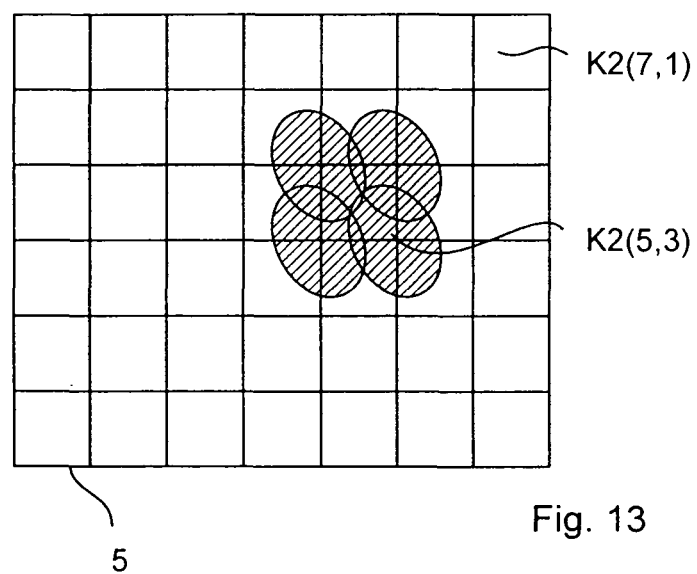

This can be prevented by the control means according to the invention as, because of the allocated pattern spots, the actual illumination on the image modulator 5 schematically corresponds to the representations of FIGS. 11 and 13. A comparison of the representations in FIGS. 11 and 13 shows that in each case approximately the same illumination intensity of the tilting mirror K2(5,3) is present irrespective of the illumination wavelength. Thus the undesired colour artefacts are avoided.

The control of the tilting mirrors of the two modulators 3 and 5 can also be described as follows. According to the pulse-width modulation data MS and BS in FIGS. 8 and 9, the illumination pixels allocated to the image pixel K2(5,3) are only ever switched on (first tilting position) when the allocated image pixel K2(5,3) is switched on (first tilting position). When the allocated image pixel K2(5,3) is switched off (second tilting position), the allocated or linked illumination pixels are also switched off (second tilting position). Thus an illumination of the image pixels (with maximum intensity) optimally matched to the bit-switching times can be carried out. Interfering background brightness from the image pixels which are directly adjacent to the image pixel of image spot B(5,3) and are illuminated on the basis of the pattern data of the pattern spots M(5,3), M(5,4), M(6,3) and M(6,4) is strongly suppressed, as these image pixels are also illuminated only during the bit-switching times P3 and P5.

Figure 14:
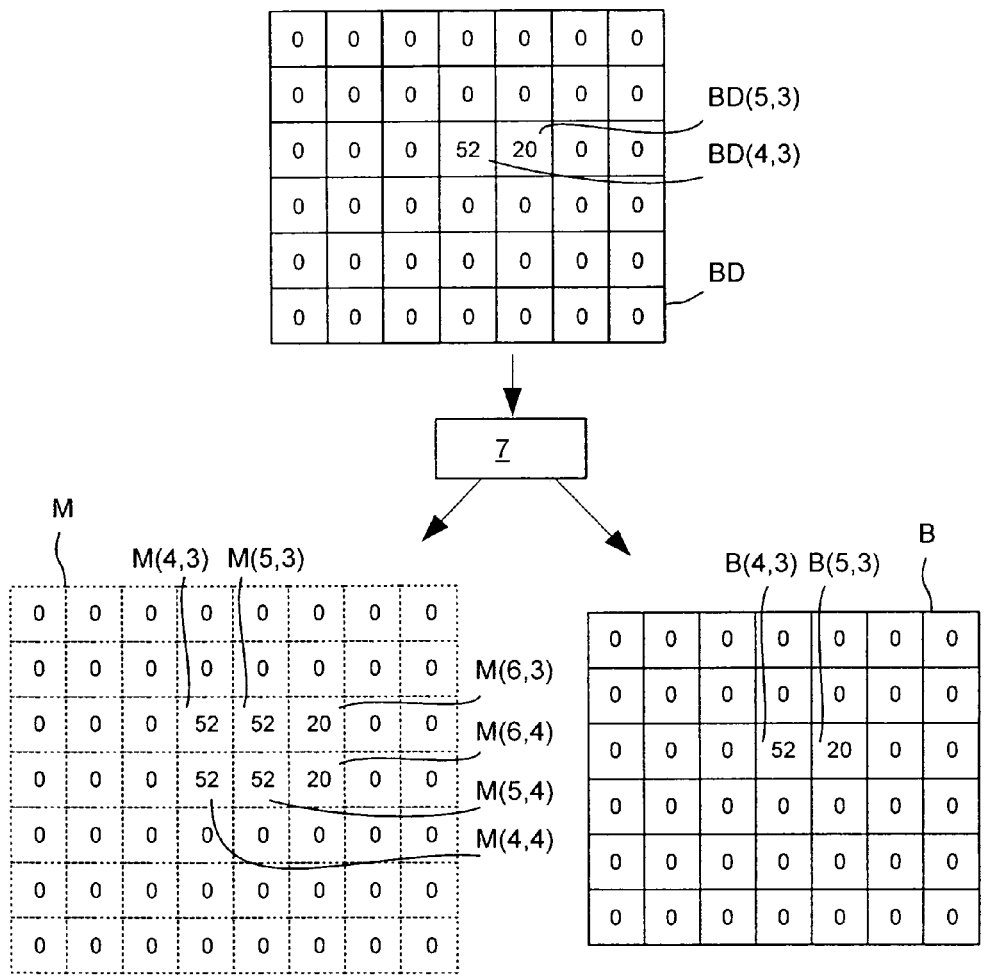
FIG. 14 is a representation explaining the generation of the pattern and image data M, B.

An example in which two image spots in the image data BD have an intensity value not equal to 0, namely the intensity value 20 (image spot BD(5,3)) and 52 (image spot BD(4,3)), is shown in FIG. 14.

Figures 15, 16:
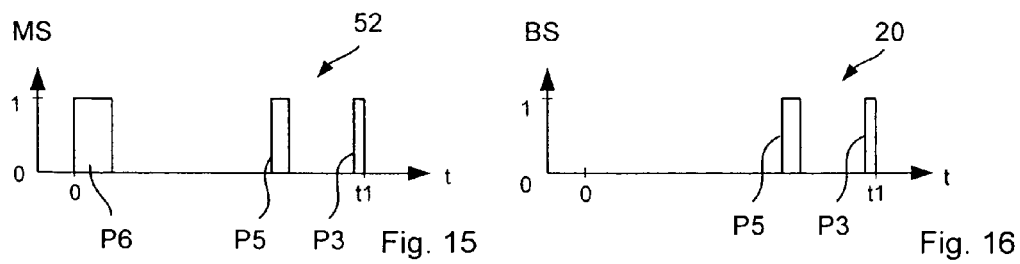
FIG. 15 is a representation explaining the pattern control data MS for the value 52.
FIG. 16 is a representation explaining the image control data BS for the value 20.

In this case, the pattern data M will comprise pattern spots M(n,m) which are linked to two image spots B(n,m) which comprise an intensity value greater than zero (thus e.g. pattern spot M(5,3) is allocated to image spots B(4,3) and B(5,3) by the imaging optics 4). The pattern data M are then generated such that the higher of the two intensity values which result from the allocation to two image spots with brightness values not equal to 0 is always generated as pattern spot value, as is schematically represented in FIG. 14. The pulse-width modulation data MS, BS for the intensity values 52 and 20 are shown in FIGS. 15 and 16.

Figure 17:
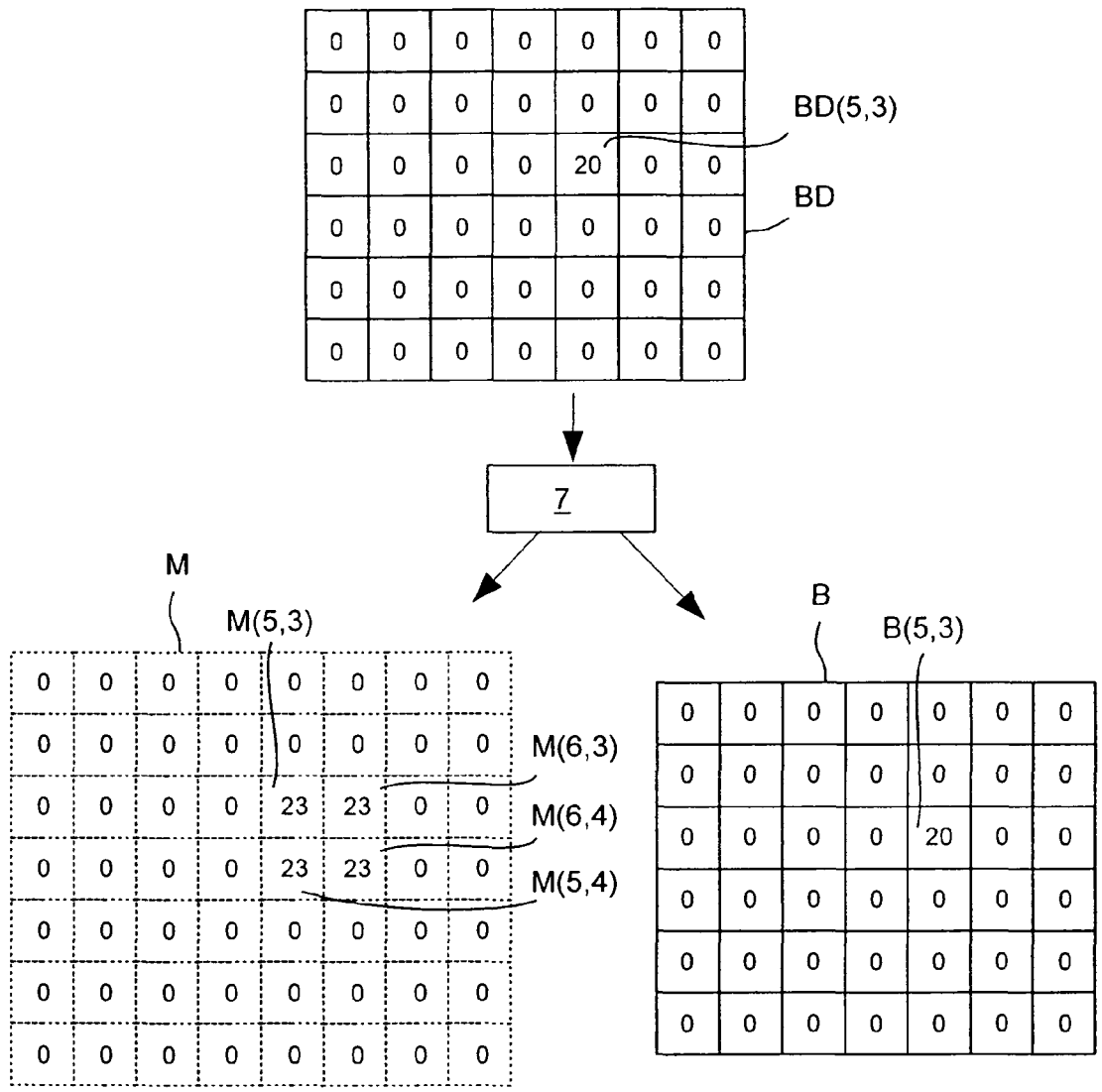
FIG. 17 is a representation explaining the generation of the pattern and image data M, B.

An example is shown in FIG. 17 in which, when generating the pattern data M, the so-called temporal dithering of the second electronic control unit 14 is taken into account. During the temporal dithering the electronic control unit 14 randomly generates pulse-width modulation data which represent a slightly modified intensity value. For example the second electronic control unit 14 can be designed such that it generates an intensity value in the range of from ±2 to the desired intensity value. Thus an intensity value of 18-22 can be generated in the example described here. The pulse-width modulation data BS for the values 18 to 22 are represented in FIGS. 19a to 19e. The figures show that the bit-switching times P1, P2, P3 and P5 occur with these pulse-width modulation values.

Therefore the control unit 7 generates the value 23 (=10111) as a value for the allocated pattern spots. It is thus ensured that for every possible pulse-width modulation value BS the corresponding image pixel is illuminated at all bit-switching times, such as e.g. a comparison of the pulse-width modulated illumination control data MS for the value 23 in FIG. 18 with the pulse-width modulation data in FIGS. 19a-19e shows.

This way of generating the pattern data M delivers the shortest possible illumination time in which it is ensured, for each pulse-width image control value BS possible on the basis of the temporal dithering, that the image pixel is illuminated when it is switched on. Thus the undesired background brightness of the surrounding image pixels which are switched off throughout the single-image time T is minimized.

In order to reduce the computational outlay for generating the pattern data, they can also be generated as follows.

The control unit 7 ascertains the pattern spot value by accessing with the value of the image spot a table in which a pattern data value which takes into account the temporal dithering in the described manner is filed for every possible image spot value. This pattern data value is then used in the pattern data.

Figure 20:
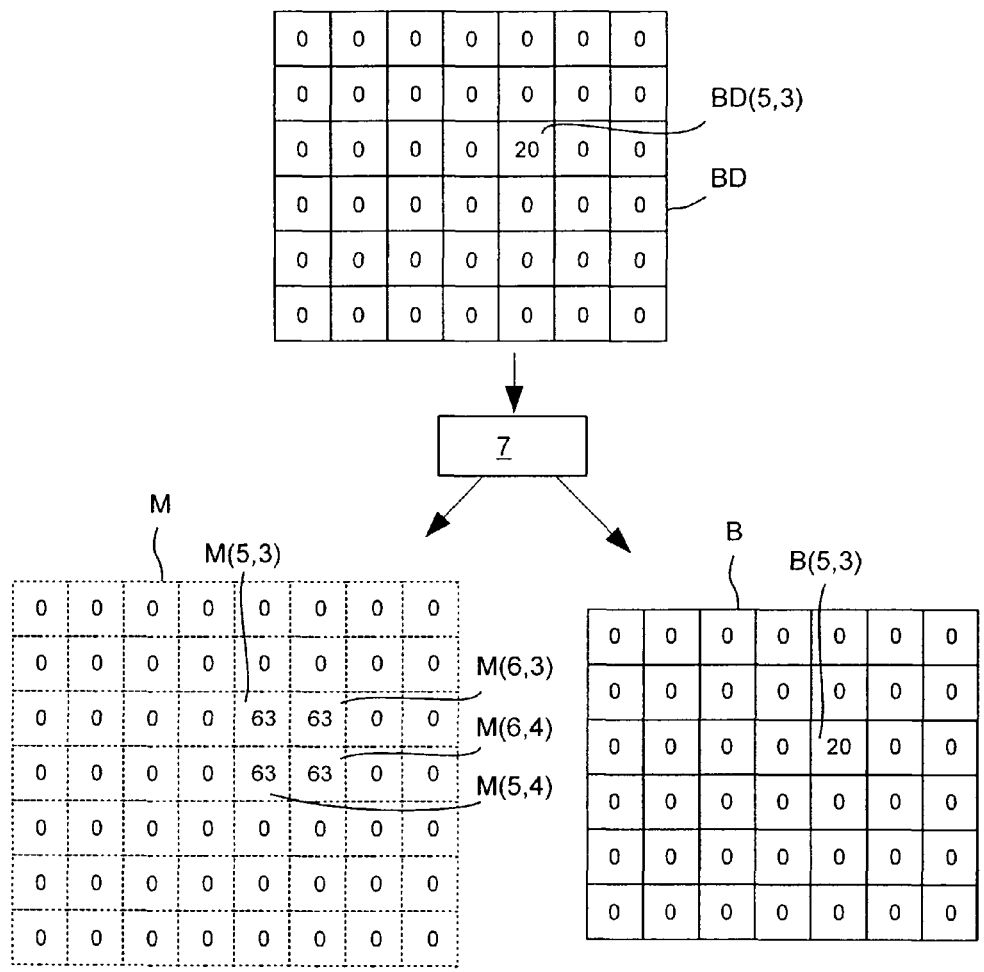
FIG. 20 is a representation explaining the generation of the pattern and image data M, B.
Figure 21:
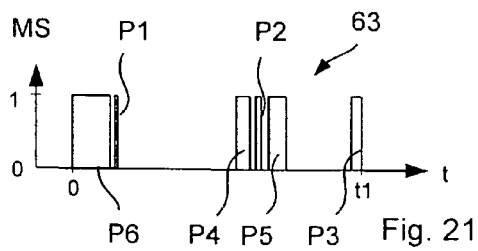
FIG. 21 is a representation explaining the pattern control data MS for the value 63.
Figure 22:
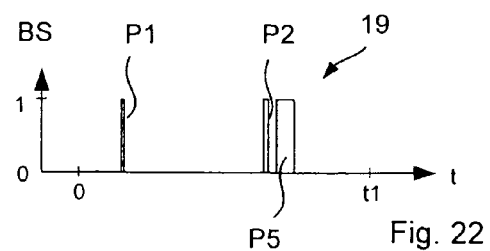
FIG. 22 is a representation explaining the image control data BS for the value 19.

Alternatively the temporal dithering can be taken into account as follows when generating the pattern data M. The control unit 7 ascertains the highest-value bit of the image spot B(5,3) which is set to 1 in the binary representation of the intensity value 20, and then sets all lower-value bits as well as the next-highest-value bit to 1. In the example described here (FIG. 20) of 20 (=00010100) this leads to the binary number 00111111 which in base 10 corresponds to the value 63. Therefore the pattern data in the pattern spots M(5,3), M(5,4), M(6,2), M(6,3) and M(6,4) each have the value 63 and all remaining pattern spots are set to 0. The pulse-width modulated control data MS for 63 and 19 are shown as examples in FIG. 21 and FIG. 22 respectively.

This means that the bit-switching times P6 and P4 are also set to 1, with the result that illumination lasts slightly longer than is absolutely necessary. However, in comparison with pattern data M in the case of which e.g. the value 255 is chosen, which would be technically simple to implement, this is still clearly shorter.

The determining of the pattern data can be simplified as follows. The control unit ascertains the highest-value bit and then uses the value which is filed for this bit in a table. The table can e.g. be as follows:

| Highest-value bit n | Value |
| --- | --- |
| 1 | 00000011 |
| 2 | 00000111 |
| 3 | 00001111 |
| 4 | 00011111 |
| 5 | 00111111 |
| 6 | 01111111 |
| 7 | 11111111 |
| 8 | 11111111 |

Alternatively, determination can take place in the control unit 7 such that the binary value 00010100 of the image spot B(5,3) is shifted one place to the left, resulting in 00101000, and 1 is then added on the right, whereby the value 00111111 (=63) is again obtained.

Figure 23:
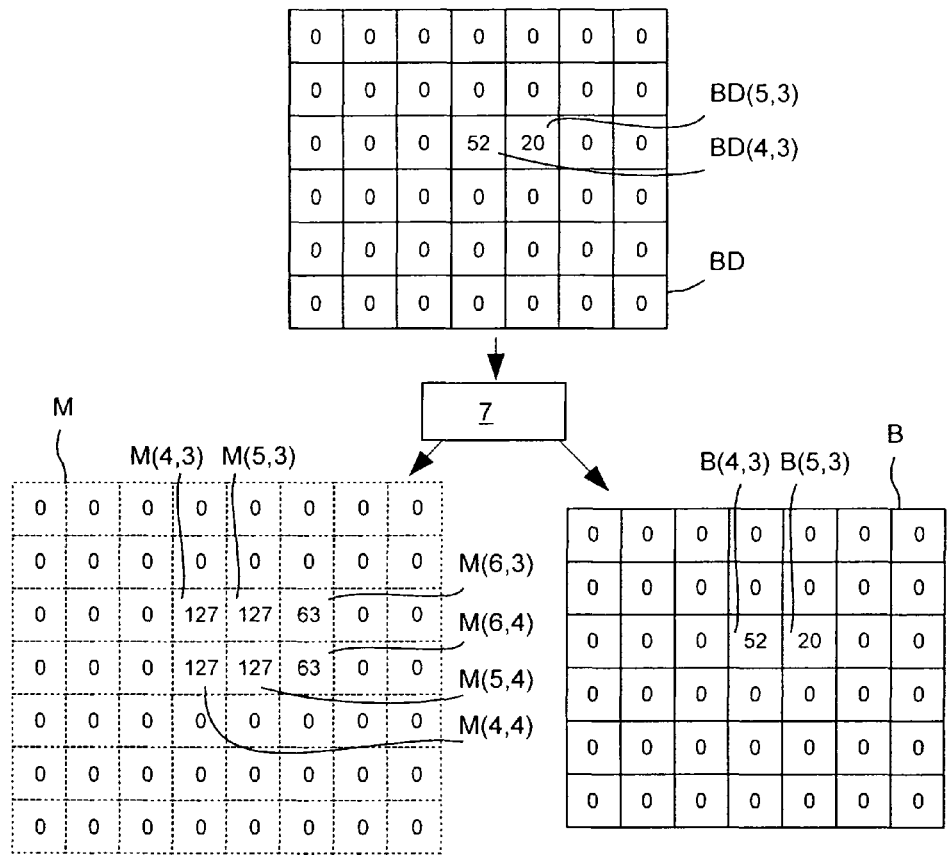
FIG. 23 is a representation explaining the generation of the pattern and image data M, B.

The example from FIG. 14 with two values not equal to 0 in the image data BD is represented in FIG. 23. If the temporal dithering is also taken into account in this example, with pattern spots M(n,m) of the pattern data M which are linked to both image spots with intensity values not equal to 0 in the image data B, an OR linking of the intensity values of the image data is carried out first.

An OR linking of 00010100 (=20) with 00110100 (=52) is thus carried out which leads to the value 00111111. This OR-value is then the basis for one of the described variants for taking temporal dithering into account. Thus e.g. the highest-value bit which is set to 1 is ascertained, all bits to the right of this are set to 1 (already the case here) and the next-highest bit is also set to 1, resulting in the value 01111111 (=127).

Figure 24A:
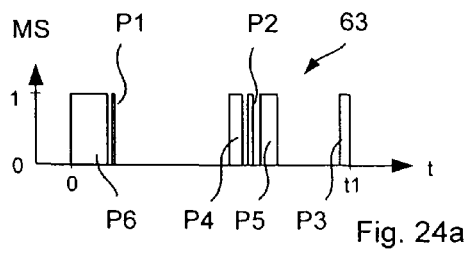
FIGS. 24a and 24b are representations explaining the pattern control data MS for the values 63 and 127.
Figure 25A:
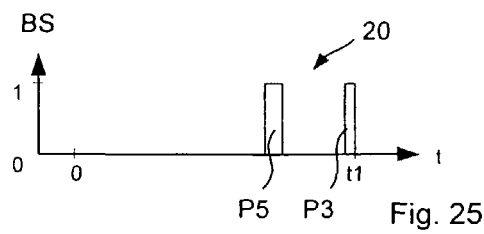
FIGS. 25a and 25b are representations explaining the image control data BS for the values 20 and 52.
Figure 24B:
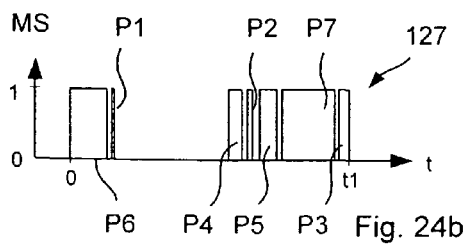
Figure 25B:
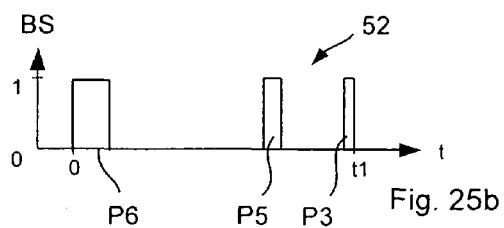

The corresponding pulse-width modulation data of the pattern data values 63 and 127 are represented in FIGS. 24a and 24b. The pulse-width modulation data of the image data values B(4,3)=52 and B(5,3)=20 are represented in FIGS. 25a and 25b.

These representations show that it is ensured that the image pixels are illuminated whenever they are brought into the first tilting position.

The described options for generating pattern and image data can also be used in the generation and projection of multicoloured images. If the multicoloured images are generated in sequential time order by successively generating e.g. a red, a green and a blue colour subframe, one of the above-described options can be used to generate each colour subframe. It is however also possible to generate and use the same pattern data for all colour subframes of an image. The same pattern data are also used in particular when the colour subframes are generated simultaneously by means of several image modulators.

Figure 26:
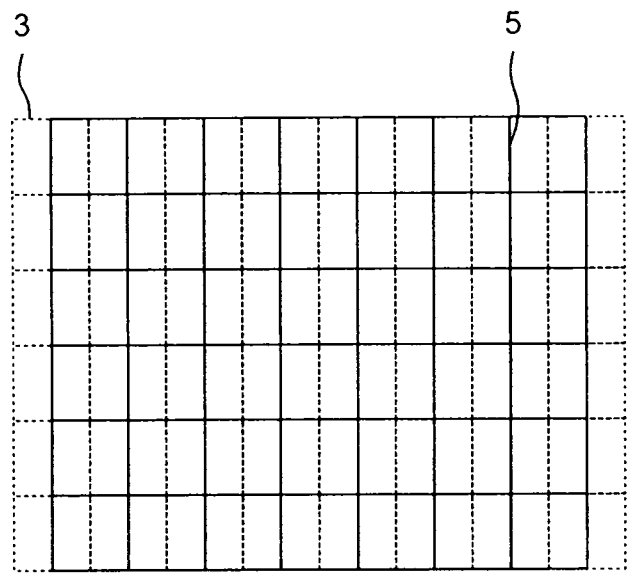
FIG. 26 is a representation explaining the allocation of the pixels of the two modulators 3, 5 according to a variant.
Figure 27:
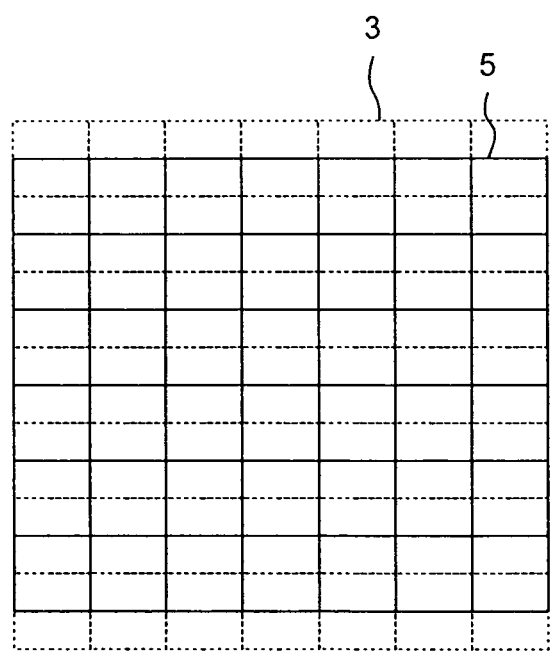
FIG. 27 is a representation explaining the allocation of the pixels of the two modulators 3, 5 according to a further variant.

The imaging optics 4 can also image the two modulators 3, 5 onto one another such that each tilting mirror K1 of the illumination modulator 3 is imaged offset by precisely half the dimension of a tilting mirror K2 of the second modulator in row direction (FIG. 26) or in column direction (FIG. 27). In this case precisely two tilting mirrors K1 of the first modulator 3 are allocated to each tilting mirror K2 of the second modulator 5.

Naturally it is also possible that the imaging optics 4 image the modulator 3 onto the modulator 5 such that precisely one tilting mirror of the modulator 3 is allocated to each tilting mirror of the modulator 5.

In the embodiments described thus far, the pattern data were generated such that, in addition to the image pixels which are to represent a brightness value greater than 0, no further image pixels are illuminated. However, the pattern data can also be generated such that, in addition to the image pixels which are to represent a brightness value greater than 0, the image pixels which are to represent a brightness value of 0 which are arranged immediately adjacent to these are additionally illuminated. Naturally it is possible to additionally illuminate not only immediately adjacent image pixels which are to represent the brightness value of 0 but also image pixels further away. For example, of the pixels which are to have a brightness value of 0, those which are no more than one, two or e.g. three image pixels (thus a predetermined number of pixels) away from an image pixel which is to represent a brightness value not equal to 0 can be illuminated. A so-called spatial dithering of the second control electronics unit 14 in which the control electronics unit 14 randomly allocates an on-value to an off-image pixel adjacent to an on-image pixel can thereby be taken into account.

Figure 28:
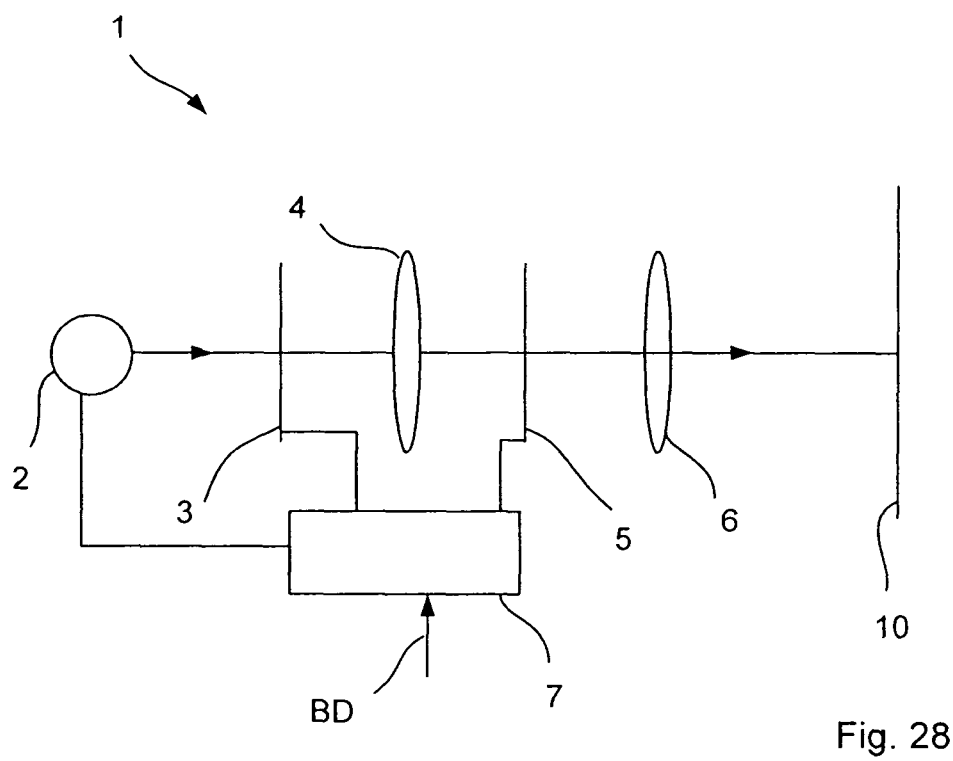
FIG. 28 is a schematic view of a further embodiment of the projector according to the invention.

An embodiment of the projector 1 according to the invention in which the modulators are designed as transmissive modulators (e.g. LCD modules) is shown in FIG. 28.

The invention claimed is:

1. A projector for projecting an image, with an illumination modulator struck by light with n×m illumination pixels which are arranged in n columns and m rows and which are controlled independently of one another in order to modulate the intensity of the light pixel-by-pixel;

imaging optics, arranged downstream of the illumination modulator, which image the light modulated pixel-by-pixel onto an image modulator, with n×m image pixels which are arranged in n columns and m rows and which are controlled independently of one another to generate the image to be projected, such that each illumination pixel is allocated to multiple image pixels and such that a portion of each illumination pixel is allocated to a portion of each of the multiple image pixels and wherein each of the portions is less than an entire pixel, a control unit, to which image data of the image to be generated are fed, and which generates, from the image data, pulse width modulation illumination control data for the illumination modulator and inputs the illumination control data into the illumination modulator to modulate the light, and also generates pulse width modulation image control data for the image modulator and inputs the image control data into the image modulator to generate an image, wherein the illumination pixels can each be switched into a first state in which the light coming from the illumination pixel is imaged onto the multiple-allocated image pixels, and into a second state in which no light from the illumination pixel is to be imaged onto the multiple allocated image pixels, and the image pixels can each be switched into a first state in which the light coming from the image pixel is used to generate an image, and into a second state in which no light from the image pixel is used to generate an image, wherein the pulse width modulation illumination control data for every illumination pixel has either an on-value to illuminate the allocated image pixels of the image modulator with the light coming from these illumination pixels to generate an image, or an off-value to minimize the intensity of the light coming from this illumination pixel and imaged onto the allocated image pixels, and are generated by the control unit such that the pulse width modulation illumination control data have the on-value for every illumination pixel which is allocated to at least one image pixel which is to represent a brightness value lying above a predetermined threshold value in the image according to the image data, which is chosen such that every illumination pixel which is allocated to at least one image pixel which is to represent a brightness value which lies above the predetermined threshold value and below a predetermined maximum value according to the image data is at least sometimes also switched into the second state during times in a selected frame period when the at least one allocated image pixel is switched into the second state;

wherein the image pixels which are to represent a brightness value which lies above the predetermined threshold value and below the predetermined maximum value are not illuminated by the allocated illumination pixel during the times in the selected frame period when the allocated illumination pixel is switched in the second state so that perceived background brightness is reduced.

2. The projector according to claim 1, in which, in the illumination control data, the on-value for the illumination pixels is chosen such that every illumination pixel which is allocated to at least one image pixel which is, according to the image data, to represent a brightness value lying above the predetermined threshold value in the image is always switched into the first state at the times when the at least one allocated image pixel is switched into the first state.

3. The projector according to claim 1, in which, in the illumination control data, the on-value for the illumination pixels is chosen such that every illumination pixel which is allocated to at least one image pixel which is, according to the image data, to represent a brightness value lying above the predetermined threshold value in the image is always switched into the first state precisely only at the times when the at least one allocated image pixel is switched into the first state.

4. The projector according to claim 1, in which the control data for each illumination and image pixel each contain a binary data value of equal bit depth, wherein the on-value for each illumination pixel which is allocated to at least one image pixel which is, according to the image data, to represent a brightness value lying above the predetermined threshold value in the image is chosen such that at least the same bits are set as in the binary data values of all allocated image pixels.

5. The projector according to claim 1, in which, in the illumination control data, the on-value for each of the illumination pixels is chosen such that all bits are set which are set in the binary data value of the at least one allocated image pixel.

6. A method for projecting an image, comprising
directing light onto an illumination modulator with n×m illumination pixels which are arranged in columns and rows and are controlled independently of one another to modulate the intensity of the light pixel-by-pixel,
imaging the light modulated pixel-by-pixel onto an image modulator with n×m image pixels arranged in columns and rows which are controlled independently of one another in order to generate the image to be projected such that each illumination pixel is allocated to multiple image pixels and such that a portion of each illumination pixel is allocated to a portion of each of the multiple image pixels and wherein each of the portions is less than an entire pixel;
generating from image data of the image to be generated, pulse width modulation illumination control data for the illumination modulator;
inputting the pulse width modulation illumination control data into the illumination modulator to modulate the light;
generating pulse width modulation image control data for the image modulator;
inputting the pulse width modulation image control data into the image modulator to generate an image;
wherein the illumination pixels can each be switched into a first state in which the light coming from the illumination pixel is imaged onto the allocated image pixels and into a second state in which no light from the illumination pixel is to be imaged onto the allocated image pixels, and
the image pixels can in each case be switched into a first state in which the light coming from the image pixel is used to generate an image, and into a second state in which no light from the image pixel is used to generate an image,
wherein the pulse width modulation illumination control data for every illumination pixel has either an on-value to illuminate the allocated image pixels of the image modulator with the light coming from these illumination pixels to generate an image, or an off-value to minimize the intensity of the light coming from this illumination pixel and imaged onto the allocated image pixels, and
generating the pulse width modulation illumination control data such that the pulse width modulation illumination control data have the on-value for every illumination pixel which is allocated to at least one image pixel which is to represent a brightness value lying above a predetermined threshold value in the image-according to the image data,
which is chosen such that every illumination pixel which is allocated to at least one image pixel which is, to represent a brightness value which lies above the predetermined threshold value and below a predetermined maximum value according to the image data is at least sometimes also switched into the second state during times in a selected frame period when the at least one allocated image pixel is switched into the second state;
wherein the image pixels which are to represent a brightness value which lies above the predetermined threshold value and below the predetermined maximum value are not illuminated by the allocated illumination pixel during the times in the selected frame period when the allocated illumination pixel is switched in the second state so that perceived background brightness is reduced.

7. The method according to claim 6, further comprising choosing, in the illumination control data, the on-value for the illumination pixels such that every illumination pixel which is allocated to at least one image pixel which is, according to the image data, to represent a brightness value lying above the predetermined threshold value in the image is always switched into the first state at the times when the at least one allocated image pixel is switched into the first state.

8. The method according to claim 6, further comprising choosing, in the illumination control data, the on-value for the illumination pixels such that every illumination pixel which is allocated to at least one image pixel which is, according to the image data, to represent a brightness value lying above the predetermined threshold value in the image is always switched into the first state precisely only at the times when the at least one allocated image pixel is switched into the first state.

9. The method according to claim 6, in which the control data for each illumination and image pixel in each case contain a binary data value of equal bit depth, and further comprising choosing the on-value for each illumination pixel which is allocated to at least one image pixel which is, according to the image data, to represent a brightness value lying above the predetermined threshold value in the image such that at least the same bits are set as in the binary data values of all allocated image pixels.

10. The method according to claim 9, further comprising choosing, in the illumination control data, the on-value for each of the illumination pixels such that all bits are set which are set in the binary data value of the at least one allocated image pixel.

* * * * *